(12) United States Patent
Takebayashi et al.

(10) Patent No.: US 6,718,229 B1
(45) Date of Patent: Apr. 6, 2004

(54) LINEAR ACTUATOR PALLETIZING SYSTEM AND METHOD

(75) Inventors: Takashi Takebayashi, Tustin, CA (US); Kevin Hudson, Tustin, CA (US)

(73) Assignee: SMC Kabushiki Kaisha, Tokyo (JP)

( * ) Notice: Subject to any disclaimer, the term of this patent is extended or adjusted under 35 U.S.C. 154(b) by 192 days.

(21) Appl. No.: 09/704,782

(22) Filed: Nov. 3, 2000

(51) Int. Cl.$^7$ ................................................. G06F 7/00
(52) U.S. Cl. ...................... 700/217; 700/245; 700/257; 414/749.1; 414/799
(58) Field of Search ................................ 700/213, 214, 700/216, 217, 245, 246, 257, 258; 414/749.1–799, 751.1, 752.1, 753.1; 901/4, 16

(56) References Cited

U.S. PATENT DOCUMENTS

| | | | |
|---|---|---|---|
| RE33,416 E | * 10/1990 | Konishi et al. | 364/478 |
| 4,969,109 A | 11/1990 | Mizuno et al. | 364/513 |
| 4,998,050 A | * 3/1991 | Nishiyama et al. | 700/248 |
| 5,844,807 A | * 12/1998 | Anderson et al. | 414/789.6 |
| 6,290,454 B1 | * 9/2001 | Huang et al. | 294/119.1 |

FOREIGN PATENT DOCUMENTS

| | | |
|---|---|---|
| JP | 1-171787 | 7/1989 |
| JP | 1-171788 | 7/1989 |

* cited by examiner

*Primary Examiner*—Donald P. Walsh
*Assistant Examiner*—Jeffery A Shapiro
(74) *Attorney, Agent, or Firm*—Paul A. Guss

(57) ABSTRACT

A method for programming a multi-axis actuator system to perform palletizing uses an intuitive user interface having a data entry screen for palletizing data, which requires only a simple setting of minimal parameters including the number of rows and columns in a pallet and the pitch spacing between pallet positions. Actuator positions necessary for palletizing movements are calculated in real time by an algorithm executed in a digital signal processor of the actuator controllers. Palletizing data entries are stored in a motion profile table in a range of consecutively paired indexes which is separated from the index range dedicated to regular single-step or torque moves.

20 Claims, 11 Drawing Sheets

FIG. 10

| Step No. | Position | Velocity | Acceleration | Deceleration | Torque | Pitch Interval | Rows | Columns | Mode |
|---|---|---|---|---|---|---|---|---|---|
| 1 | -- | Vel | Accel | -- | Torq | -- | -- | -- | Torque |
| 2 | A_Pos | Vel | Accel | Decel | -- | -- | -- | -- | Absolute |
| ... | ... | ... | ... | ... | ... | ... | ... | ... | ... |
| 117 | R_Pos | Vel | Accel | Decel | -- | -- | -- | -- | Relative |
| 118 | Off_Pos | Vel | Accel | Decel | -- | Pitch | N_rows | M_columns | Pallet Variables |
| 119 | -- | -- | -- | -- | -- | -- | -- | -- | Reset Counter of Step 118 |
| ... | ... | ... | ... | ... | ... | ... | ... | ... | ... |
| 126 | Off_Pos | Vel | Accel | Decel | -- | Pitch | N_rows | M_columns | Pallet Variables |
| 127 | -- | -- | -- | -- | -- | -- | -- | -- | Reset Counter of Step 126 |

LINEAR ACTUATOR PALLETIZING SYSTEM AND METHOD

BACKGROUND OF THE INVENTION

1. Field of the Invention

The present invention relates to automated assembly systems employing linear drive mechanisms, and more particularly to a system for performing palletizing using a plurality of linear actuators having associated controllers, and to a program which facilitates entry of palletizing parameters to the controllers, for controlling action of the linear actuators according to preset palletizing conditions.

2. Background of the Invention

Linear actuators have been widely used in automated assembly procedures due to their inherent robustness, ease of variation in size and configuration, and the accuracy with which such actuators can be controlled to transport parts or tools to a precise location while following tightly controlled patterns of movement.

A known type of electric linear actuator, to which the principles of the present invention are applied, is shown in FIGS. 1 through 3.

The electric actuator, generally denoted at 50 in FIGS. 1 through 3, comprises an elongate frame 52 as a base, a pair of elongate side covers 54a, 54b mounted respectively on transversely opposite sides of the frame 52, a pair of end covers 56, 57 mounted respectively on longitudinally opposite ends of the frame 52, and an elongate top cover 58 engaging upper surfaces of the side covers 54a, 54b.

On the frame 52, there are mounted a drive mechanism 60 fixed to one end of the frame 52 and supporting one end of a ball screw 62, a bearing block 64 fixed to the other end of the frame 52 and supporting the other end of the ball screw 62, and a table mechanism 66 linearly displaceable between the drive mechanism 60 and the bearing block 64 by the ball screw 62 upon rotation thereof. A pair of transversely spaced guide members 68a, 68b is fixed to an upper surface of the frame 52 for linearly guiding the table mechanism 66 when the table mechanism 66 is displaced by the ball screw 62. The bearing block 64 comprises a support block 22 mounted on the frame 52, and the other end of the ball screw 62 is rotatably supported in the support block 22 by a bearing 24.

The frame 52 has two transversely spaced grooves 70a, 70b of an identical T-shaped cross section which are defined in a lower surface thereof and extend parallel to each other in the longitudinal direction of the frame 52. The transversely opposite sides of the frame 52 have respective engaging grooves 72a, 72b defined therein and extending longitudinally therealong for attachment of the side covers 54a, 54b. The frame 52 also has longitudinal passageways 74a, 74b, 76a, 76b defined therein for accommodating electric wires or hydraulic fluid conduits. The frame 52 has a pair of attachment grooves 77a, 77b defined in an upper surface thereof near the passageways 76a, 76b for attachment of detectors such as automatic switches or the like. The attachment grooves 77a, 77b also serve as wiring grooves for accommodating leads connected to the detectors.

The side covers 54a, 54b have respective substantially L-shaped hooks 78a, 78b disposed on inner sides thereof for engaging in the respective engaging grooves 72a, 72b. The hooks 78a, 78b can be fitted into respective engaging grooves 72a, 72b when the side covers 54a, 54b are pressed obliquely downward against the transversely opposite sides, respectively, of the frame 52. To detach the side covers 54a, 54b from the frame 52, the side covers 54a, 54b are pulled upwardly away from the transversely opposite sides, respectively, of the frame 52. Therefore, the side covers 54a, 54b can easily be installed on and removed from the frame 52.

As shown in FIG. 2, the table mechanism 66 comprises a ball screw bushing 80 for converting rotary motion of the ball screw 62 into linear motion, a pair of table blocks 82a, 82b holding transversely opposite sides, respectively, of the ball screw bushing 80, and a pair of holders 84a, 84b having a channel-shaped cross section interposed between the table blocks 82a; 82b and the guide members 68a, 68b. As shown in FIG. 1, the table blocks 82a, 82b have holes 86 defined in their upper surfaces for coupling a member that is mounted on the table blocks 82a, 82b, and the table block 82b has a recess 88 defined in its upper surface for positioning a workpiece highly accurately.

In the case of multi-axis configurations, the table blocks 82a, 82b can support yet another linear actuator thereon, to enable the movement of a table block of the thus-supported actuator in both X and Y directions, for example.

As shown in FIG. 3, the drive mechanism 60 comprises a housing 106 mounted on the frame 52 and having a bearing 104 to which one end of the ball screw 62 is rotatably supported, a motor 108, and an encoder 112 covered by a cover 110. The housing 106 which supports the ball screw 62 serves as a motor body.

The motor 108 is fixed to the housing 106, and comprises a stator 116 composed of a plurality of separate stator cores 114 that are joined together, a plurality of coils 118 wound around the respective stator cores 114, and an annular permanent magnet 122 serving as a rotor which is fixedly mounted on a reduced-diameter end 62a of the ball screw 62 through a sleeve 120.

As shall be explained in greater detail in connection with the preferred embodiments of the invention, typically a linear actuator, such as the one described above, will be provided as only one actuator in a multi-axis system of actuators, which are connected together as a structural system, for enabling movement of an end effector (for example a gripping tool) in two or more dimensions, for picking up objects (parts) and delivering them to a desired destination, for example an assembly station.

In many assembly operations, a plurality of identical parts for assembly are arranged in a specified array inside a pallet, in an ordered pattern of rows and columns, and the parts are required to be delivered sequentially to an assembly station where the parts are assembled onto another component located in the assembly station. In such a situation, it is convenient to undertake a so called palletizing operation. More specifically, a gripping tool which is movable under the power of actuators is moved to a first position to pick up a first part in the pallet array, grip the part and deliver it to an assembly position where the part is assembled onto another, usually larger, component. After the part is assembled onto the component, the actuators are again driven to return the gripping tool to the pallet array, however, at this time the gripping member is controlled through a series of pre-stored movement patterns to be indexed to the next part in the array (for example, the part in the next column of the first row) so that the second part is then picked up and delivered to the assembly station for assembly onto the same or another component. When the first row of parts has been completed, the actuator can be indexed to the next row, proceeding in sequence until all parts in the pallet have been delivered to the assembly station.

Typically, movement of a linear actuator is controlled by inputting into a stored motion profile table (MPT) various parameters to control movement of the table blocks 82a, 82b or any member attached to the table blocks, at a set acceleration, velocity and deceleration, until reaching the desired position. A plurality of pre-programmed movements are each stored in the motion profile table as steps, wherein each step moves the table blocks 82a, 82b to one predetermined position according to a given acceleration-velocity-deceleration profile. When a series of movements is to be performed in sequence, a plurality of steps must first be pre-programmed and stored, and then the series of steps is run in a chosen order dictated by a Programmable Logic Controller (PLC). In multi-axis systems, of course, each actuator must be programmed to execute its own movements per each step in concert with the other actuators, adding more complexity.

In a palletizing operation, however, it is easily understood that because the parts in the pallet are arranged in an ordered array of rows and columns, the movements of the actuators for positioning a gripping tool to pick up the parts are highly regularized. That is, with each return of the gripping tool to the pallet to pick up a new part, it is simply indexed by one row or one column from the position at which the last part was previously picked up. Therefore, while it is conceivable to pre-program each return to the pallet as its own individual step, to do so is highly inefficient and fails to take advantage of the ordered arrangement of parts stored in the pallet.

Moreover, the motion profile table in a typical linear actuator controller allows for only about 128 individual steps to be set and pre-stored. However, a 20 row×10 column pallet, which is not unusual, involves 200 separate part positions and will easily exceed the storage capacity for individual step moves in the motion profile table.

A palletizing program based on an understanding of the ordered structure of rows and columns for controlling a robotic arm, for example, has been disclosed in U.S. Pat. No. 4,969,109. However, this scheme does not provide a method for performing palletizing operations for a system of interconnected and mutually operable linear actuators. Further, the system lacks any kind of ergonomic interface enabling easy setting and adjustment of palletizing parameters by simply entering interval separations between objects arranged in the columns and rows of the pallet.

SUMMARY OF THE INVENTION

It is a principal object of the present invention to provide a system and method for controlling linear actuators to perform palletizing operations, which enables palletizing patterns to be entered as a set of simple pitch parameters corresponding to the intervals between rows and columns at which articles are arranged in a pallet, and then automatically generating a motion pattern of an end effector for picking up each article sequentially.

It is a further object of the present invention to provide a system and method for controlling a linear actuator wherein a palletizing operation can be entered as single step in a motion profile table, rather than a series of individually entered steps.

A still further object of the invention is to provide a system and method for performing palletizing moves by computing the moves in real time within the digital signal processor of a controller which controls a linear actuator.

The above and other objects, features and advantages of the present invention will become apparent from the following description when taken in conjunction with the accompanying drawings in which preferred embodiments of the present invention are shown by way of illustrative example.

BRIEF DESCRIPTION OF THE DRAWINGS

FIG. 10 is a representative example of data stored in a Motional Profile Table (MPT) of the actuator controller.

DETAILED DESCRIPTION OF THE PREFERRED EMBODIMENTS

Figure 1:
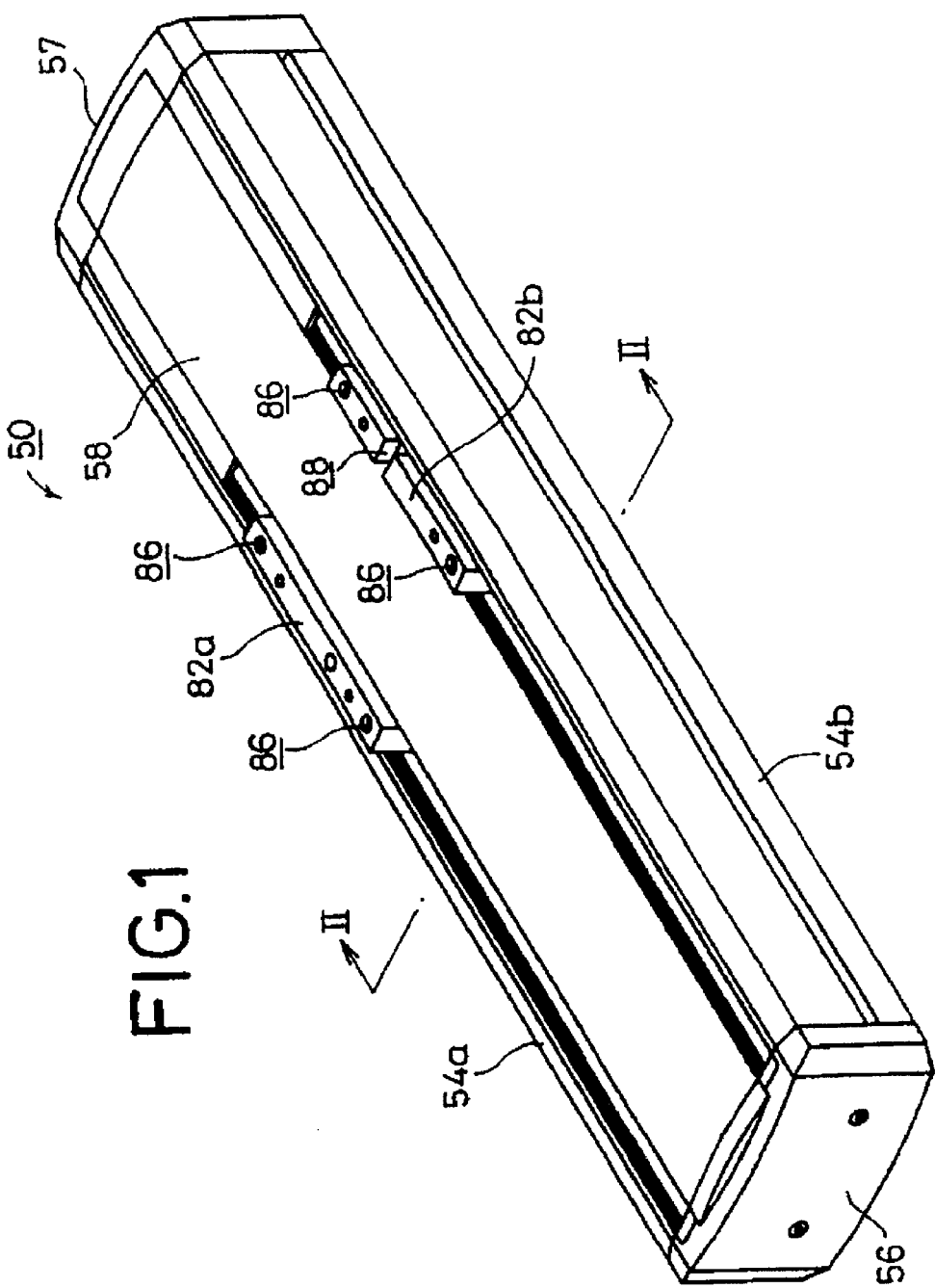
FIG. 1 is a perspective view of a known type of electric actuator according to which the principles of the present invention are applied.
Figure 2:
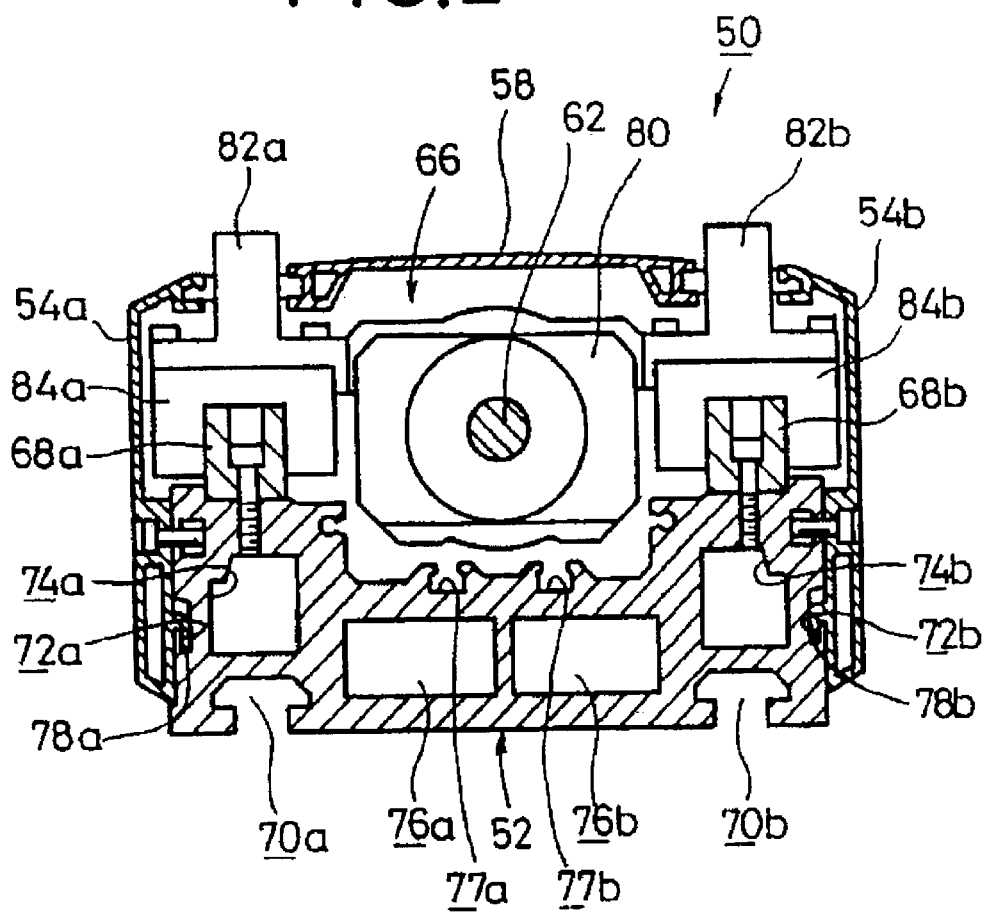
FIG. 2 is a transverse cross-sectional view taken along line II—II of FIG. 1.
Figure 3:
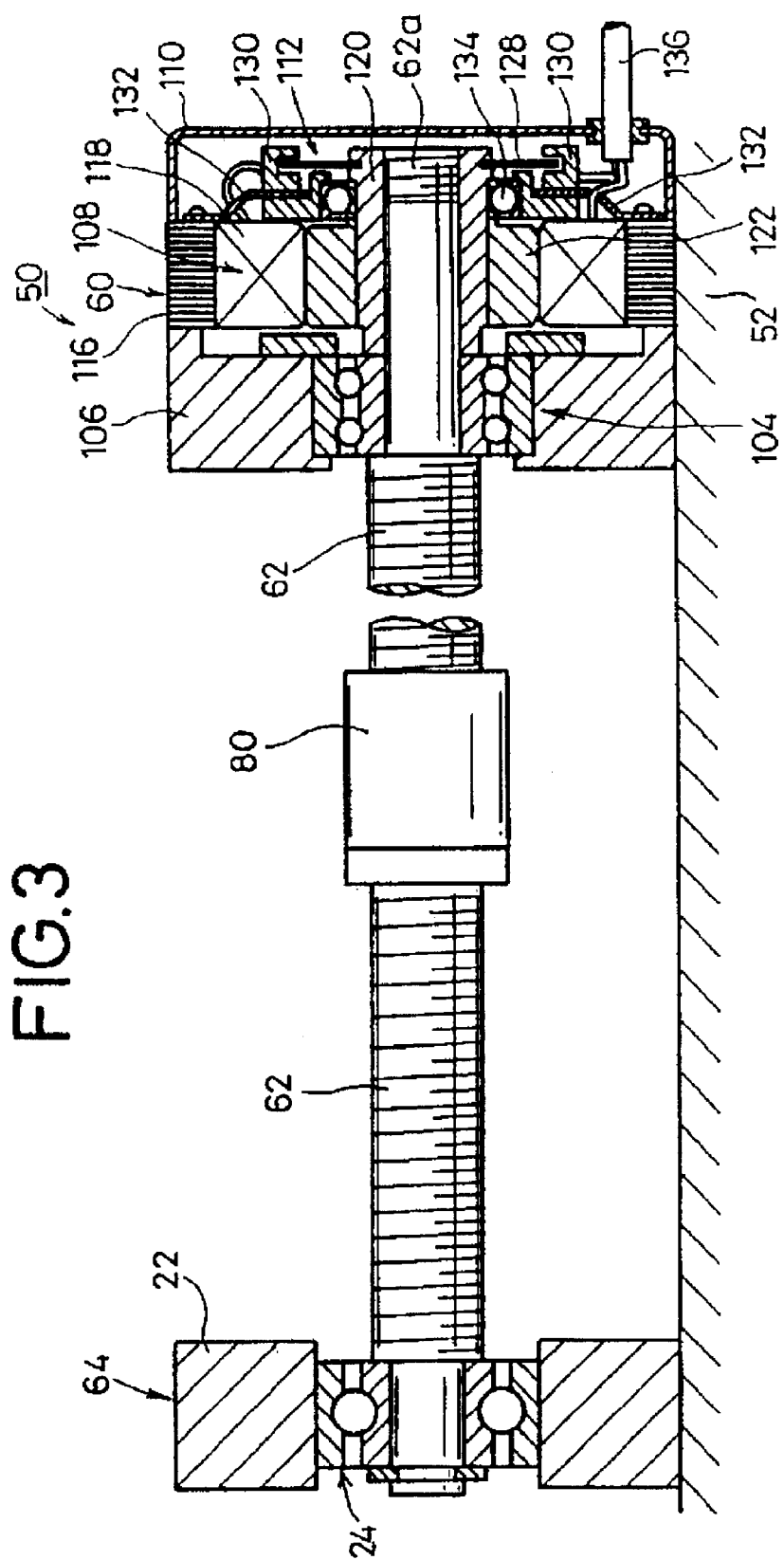
FIG. 3 is a fragmentary longitudinal cross-sectional view of the electric actuator shown in FIG. 1.
Figure 4:
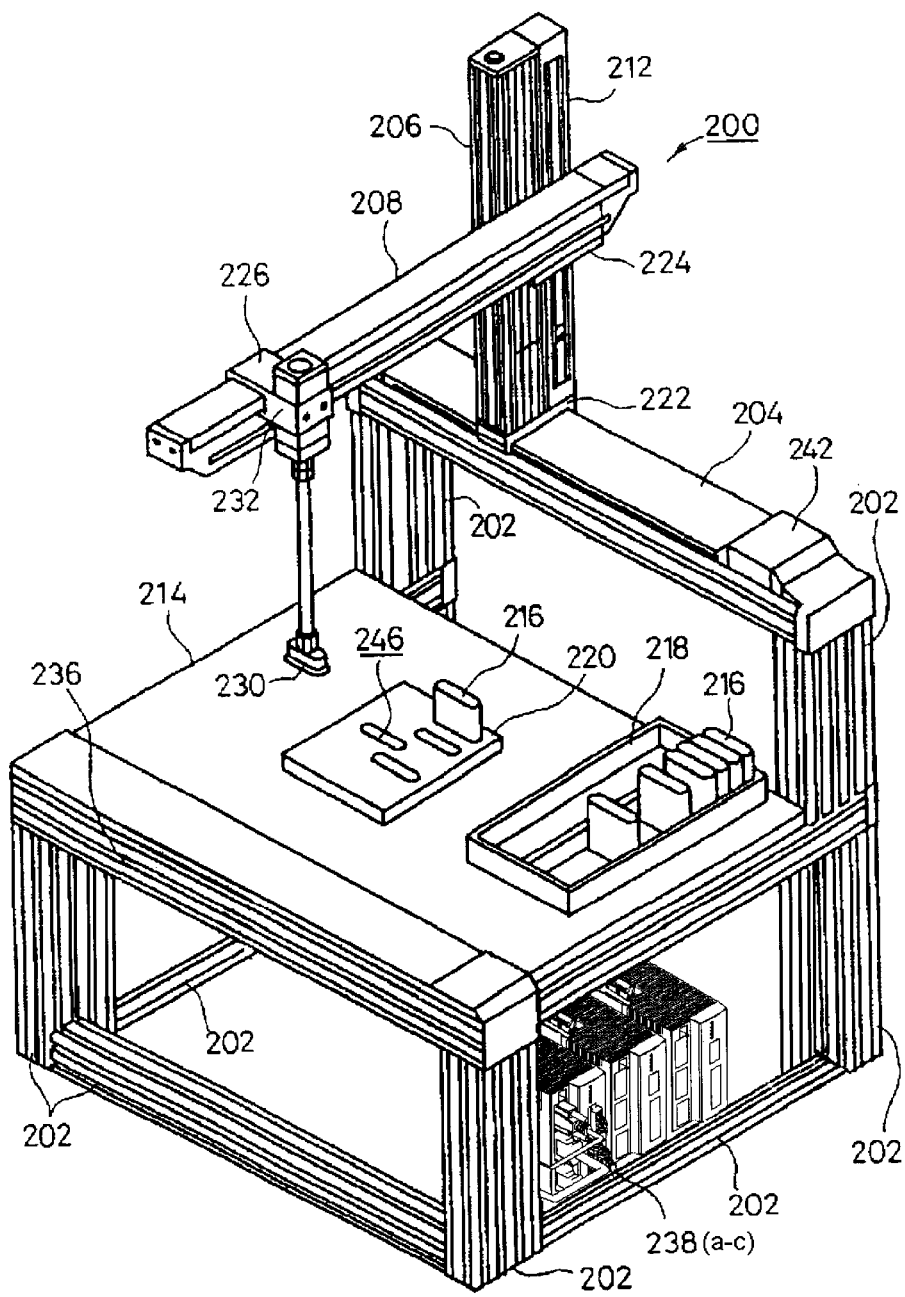
FIG. 4 is a perspective view of a first assembly of electric actuators arranged as a structural body according to the present invention.

As shown in FIG. 4, a first assembly of an actuator structural body 200 comprises a plurality of columnar members 202 which constitute a skeleton and first through third electric linear actuators 204, 206 and 208. A pneumatic balancer 212 may be associated with the vertical second actuator 206 for aiding in its vertical movement. A working table 214 supports workpieces 216 which are accommodated in a workpiece storage pallet 218, wherein the workpieces 216 are to be assembled onto a component platen 220. Each of the linear actuators comprises respective movable bodies 222, 224 and 226. A cylinder 232 having a suction pad 230 coupled thereto serving as a workpiece gripping means is provided on the movable body 226. To be discussed in further detail later, serial connected programmable actuator controllers 238(*a–c*) are provided for controlling coordinated movements of the electric actuators 204, 206 and 208. The actuators 204, 206 and 208 are of a basic structure, the internal components of which are substantially the same as shown in FIGS. 1 through 3 described above, although the actuators may vary in size, power capacity, and external appearance.

Non-illustrated components which are not essential to the understanding of the present invention include a compressor for controlling the cylinder 232 and a suction device to circulate a vacuum pressure to the suction cup gripper 230, which may be assembled in an integral structure inserted in or alongside the blocks of the actuators 204, 206 and 208, or may be integrally arranged, connected and wired in or alongside the columnar members 202. Alternatively, an electrically actuated gripper device, which can be controlled to grip an object at a preset actuator motor torque after in initial low velocity contact step, can be used in place of the suction cup gripper 230.

The first actuator 204 serves to linearly move the second actuator 206 and the balancer 212 which are mounted on an upper surface of the movable body 222. The second actuator 206 connected perpendicularly to the first actuator 204, and the balancer 212 associated with the second actuator 206 serve to vertically move the third actuator 208 mounted on the movable body 224. The cylinder 232 with the suction pad 230 connected thereto is joined to the movable body 226 disposed on the third actuator 208 which is connected perpendicularly to the second actuator 206 and the balancer 212 associated with the second actuator 206. A motor box 242 is disposed at a junction between the first actuator 204 and the columnar member 202. The motor box 242 may be also shaped so as to lie flush with the upper surfaces of the first actuator 204 without projecting therefrom.

The actuator structural body 200 operates as follows: Compressed air is supplied through fluid passages in the columnar members 202 to the cylinder 232 coupled to the third actuator 208. When the compressed air is supplied, the cylinder rod of the cylinder 232 is displaced downwardly, and the suction pad 230 attracts a workpiece 216 in the workpiece storage pallet 218. Compressed air is supplied again to displace the cylinder rod upwardly, and while the cylinder rod is being displaced upwardly, the movable body 224 on the balancer 212 which is associated with the second actuator 206 is moved upwardly, thereby moving the third actuator 208 upwardly. The movable body 222 on the first actuator 204 is moved to transport the second actuator 206 connected to the movable body 222 and the balancer 212 associated with the second actuator 206. The first actuator 204 and the third actuator 208 stop moving when the workpiece 206 attracted by the suction pad 230 has moved to a desired position above the platen 220. The movable body 224 on the second actuator 206 and the balancer 212 associated therewith, and the cylinder rod of the cylinder 232 are lowered to insert the workpiece 216 into a hole 246 defined in the component platen 220. At this time, the cylinder rod 234 of the fourth actuator 210 can be displaced to position the workpiece 216 in the hole 246. The workpiece storage pallet 218 and the component platen 220 may be positioned on the working table 216 by a non-illustrated positioning means.

After one of the parts from the workpiece storage pallet 218 has been installed on the component platen 220, the actuators are controlled for returning the suction pad 230 to the storage pallet 218 for attracting yet another workpiece 216. At this time, the suction pad 230 is positioned, according to a palletizing routine, to pick up the next available workpiece 216 in the storage pallet 218, and then deliver it to the component platen 220, or to another component platen (not shown) which has replaced the previously positioned platen at the assembly location. This series of steps is repeated sequentially until all of the workpieces 216 in one row have been delivered to the assembly location, whereupon the suction pad 230 is indexed to a next row for picking up and delivering the objects sequentially in the next row, and so forth.

Figure 5:
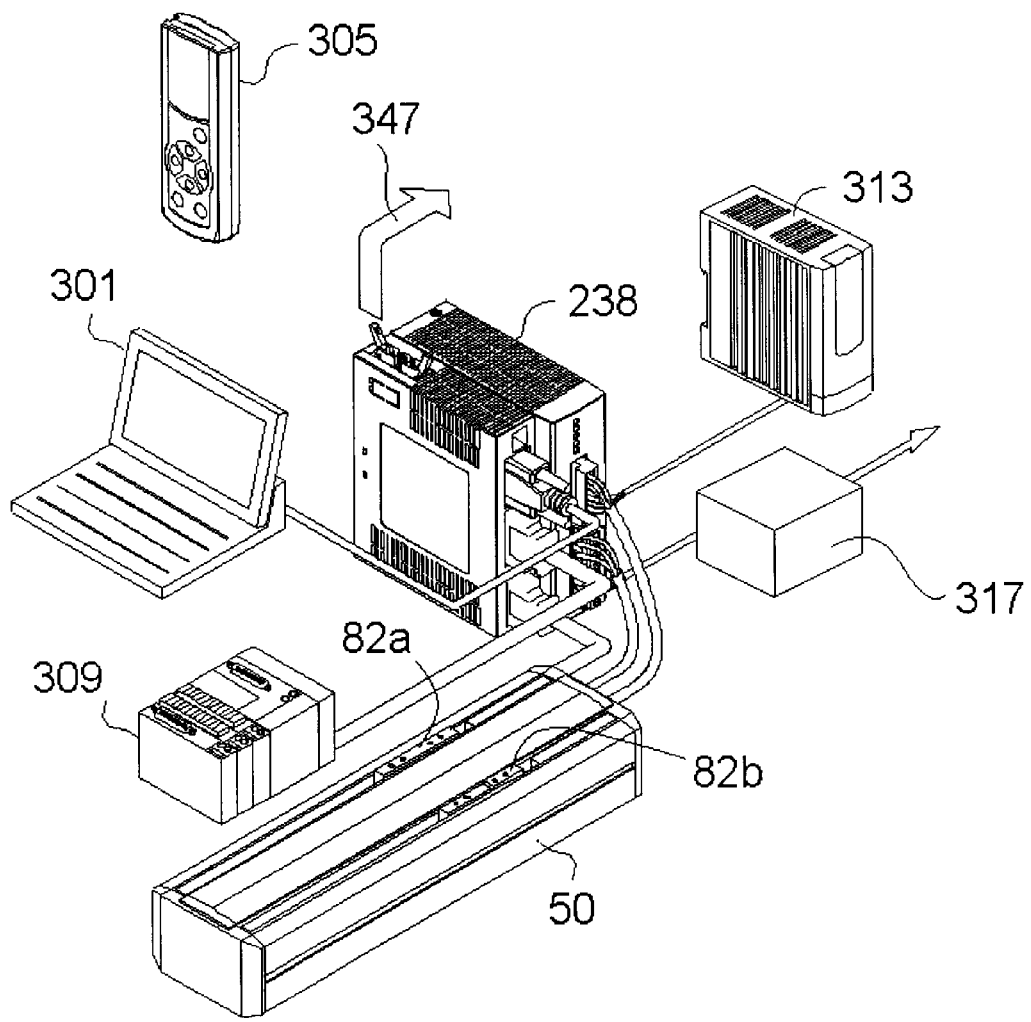
FIG. 5 is an overall system configuration for controlling an electric linear actuator, including a Human Machine Interface (HMI), for setting regular actuator step movements as well as parameters for palletizing moves.

An overall system configuration for controlling an electric linear actuator 50a is shown in FIG. 5. Setting of regular single-step moves for the actuator are performed via a human machine interface (HMI) program which is run on a PC 301, or alternatively, may be set using a teaching box 305. Palletizing parameters are set primarily through a programming feature of the HMI software which runs on PC 301. Essentially, the teaching box 305 provides a simplified alternative interface for entering and storing physical characteristics of the actuator 50 and properties of preprogrammed motion steps prior to operation of the actuator 50. Understanding of the palletizing operations which make up the subject matter of the present application shall be described with reference to the HMI software, and further details of the teaching box 305 will not be described.

Figure 6:
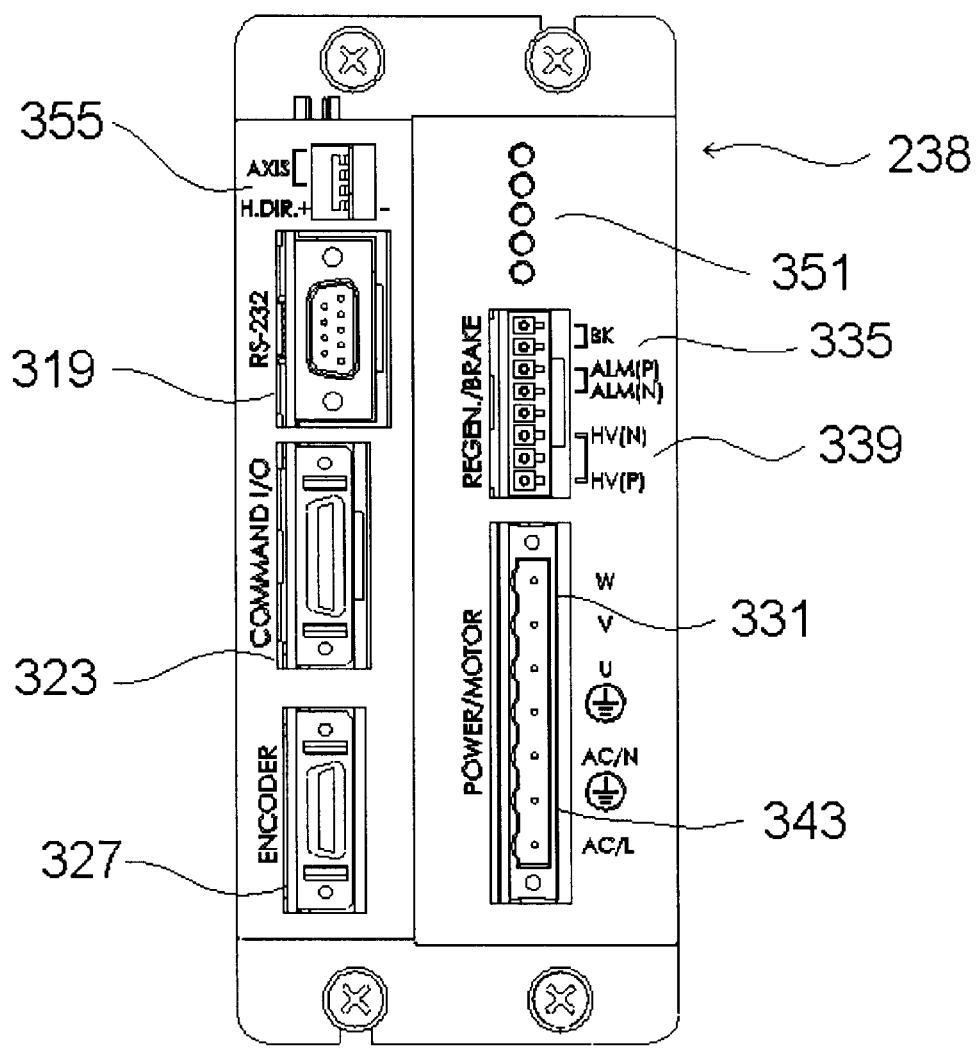
FIG. 6 is a frontal plan view of an actuator controller showing detail of the connector assembly on a front face thereof.

Referring also to FIG. 6, the PC 301 is connected to a serial input port 319 of the controller 238, whereby parameters set via the HMI software can be transferred as data making up a Motion Profile Table (MPT) stored in a data storage area of the controller 238. The serial connection 319 between the PC 301 and controller 238 is bi-directional, so that the MPT data currently stored in the controller 238 can also be uploaded as parameters into the HMI software, for modification if desired.

A Programmable Logic Controller (PLC) 309 for sending sequential step commands to the controller 238 is connected through an I/O port 323. More specifically, the PLC 309 sends signals to the controller 238 through I/O port 323 for instructing the controller 238 to execute a given sequence of steps, from among the steps previously entered in the MPT, including steps for executing palletizing movements (to be described later). The controller 238 also outputs signals to the PLC 309 through the I/O port 323 which indicate each step number as it is being executed. The PLC 309 is also capable of sending commands to start and stop sequence execution, emergency stop, reset and homing. Such features, since they are not central to palletizing, are not critical to an understanding of the present invention and shall not be explained in further detail.

The linear actuator 50, is connected with the controller 238 through at least two, and potentially three, connecting cables. One cable connects an output from the encoder 112 (see FIG. 3) of the actuator to the encoder connector port 327, for delivering a signal to the controller which is indicative of the position of the table blocks 82a, 82b. A second cable is provided for connection to the motor power leads of the actuator 50 from power terminals 331. A third optional cable may be used if the actuator 50 is equipped with a known type of breaking mechanism (not shown) in which case signals can be sent from the brake connector 335 for controlling application of the motor brake.

When the actuator 50 is installed for certain vertical applications, a regenerative resistor unit 313 can optionally be connected to terminal connections 339. For example, as a heavy object transported by the table blocks 82a, 82b falls downward, the motor 108 generates a current which is dissipated through the regenerative resistor unit 313 which consumes and absorbs the regenerative power-generated by the motor 108, slowing the fall of the object in a controlled manner.

The power/motor connector also provides terminals 343 for input of an AC main power supply to the controller 238 through a circuit breaker 317.

FIG. 5 shows a configuration for a single linear actuator 50 only. However, as shown in FIG. 4, when a multi-axis configuration is used comprising respective actuators, plural controllers 238(a–c) are interconnected through a serial communication line 347 to multi-axis connectors on each respective controller. In such a case, the PC 301 (or alternatively teaching box 305) and the PLC 307 need only be connected to the first of the serial-connected controllers 238a which serves as a master unit, and the other controllers 238b, 238c operate as slaves.

As shown in FIG. 6, the controller 238 also includes five LED status indicators 351 thereon for indicating the state of operation of the controller. The status indicators include a Power indicator for indicating that power is being supplied to the controller, a Set-On indicator for indicating that the controller is ready to accept motion commands, a Busy indicator for indicating that the controller is in the process of moving an actuator, and Alarm and Error indicators which indicate that alarms or errors are present in the system. DIP switches 355 are also provided for setting an axis ID number in the case of multi-axis operation, and for setting a home direction, i.e., which end of the actuator is to be treated as the home position for the actuator.

The actuator system is constructed basically as described above. Now features and operation of the actuator system for executing a palletizing operation, shall be described below in detail.

Figure 7:
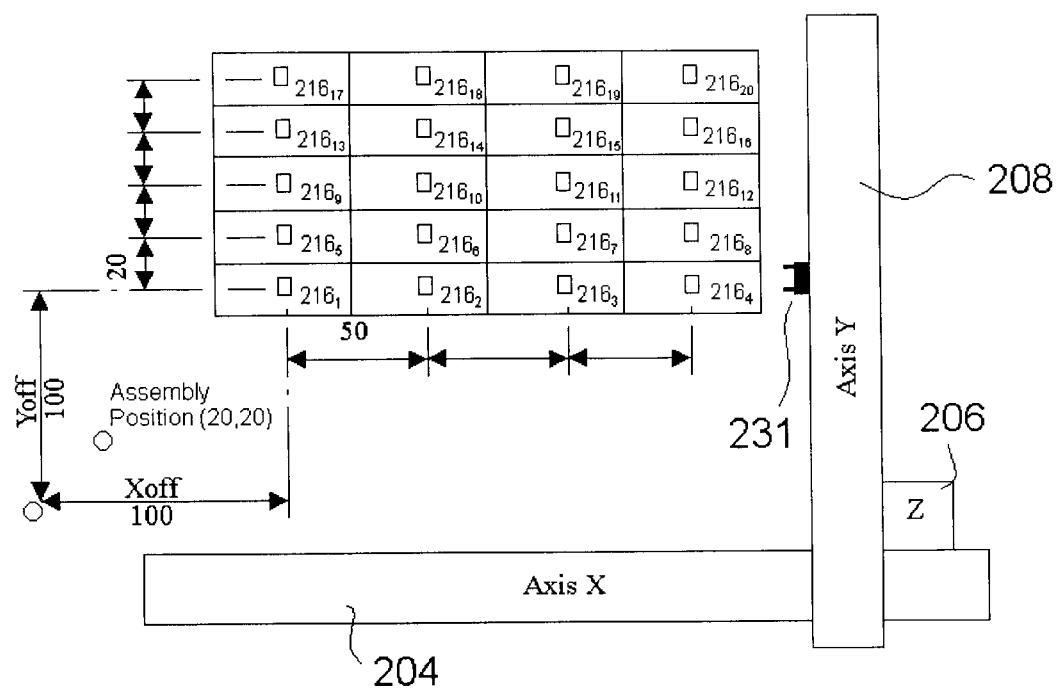
FIG. 7 is a schematic representation showing the pallet arrangement for a multi-axis actuator system.

FIG. 7 is a schematic representation showing a typical palletizing arrangement for a multi-axis actuator system. Corresponding roughly to the arrangement shown in FIG. 4, three linear actuators are provided, made up of an X-axis actuator 204, a Z-axis actuator 206 disposed for movement in the X-axis direction along the X-axis actuator 204, and a Y-axis actuator 208 supported for movement in the Z-axis direction along the Z-axis actuator 206. In addition, a gripping actuator, in this case an electric gripper 231, is supported for movement in the Y-axis direction along the Y-axis actuator 208.

A plurality of workpiece parts $216_1$ through $216_{20}$ are disposed in an ordered arrangement of five rows and four columns, referred to as a pallet 218. The workpiece parts $216_1$ through $216_{20}$ disposed in each row are separated from each other by an equidistant pitch of 50 units in the X-axis direction, whereas the parts disposed in each column are separated by an equidistant pitch of 20 units in the Y-axis direction. The first workpiece $261_1$ to be picked up is disposed at an X,Y offset distance from a "home" position of each of the actuators 204 and 208, of 100 units in each of the X and Y-axis directions. As assembly position is located at an absolute position of (20,20).

The goal to be accomplished in the arrangement shown in FIG. 8 is to transfer each of the workpiece parts $261_1$ through $216_{20}$ sequentially from its position in the pallet 218 to the same assembly location (20,20). It may be assumed, in this example, that when it arrives at the assembly location, the part is installed onto some other component, then during the interval in which gripper 231 is returned to pick up the next part, a next component is placed in the assembly location, so that when the next part returns to the assembly location it can be installed on the next component, and so forth.

It will be understood that the arrangement of FIG. 7 is only one example of a palletizing operation. The number of actuators used, orientation of axes, etc. are variable based on the needs of any particular application. Further, although this example involves unpacking of parts from a pallet, it is equally possible to conceive of a system in which parts are picked up sequentially from a given location, and then delivered sequentially for packing into a pallet. Both packing and unpacking of parts to/from an ordered arrangement of rows and columns are considered involve "palletizing" as the term is understood and used in the present specification. It is also possible to use shifting of a Z-axis pitch in a palletizing operation in the case that parts are desired to be packed or unpacked not only into rows and columns, but also into vertical stacks, for example.

Figure 8A:
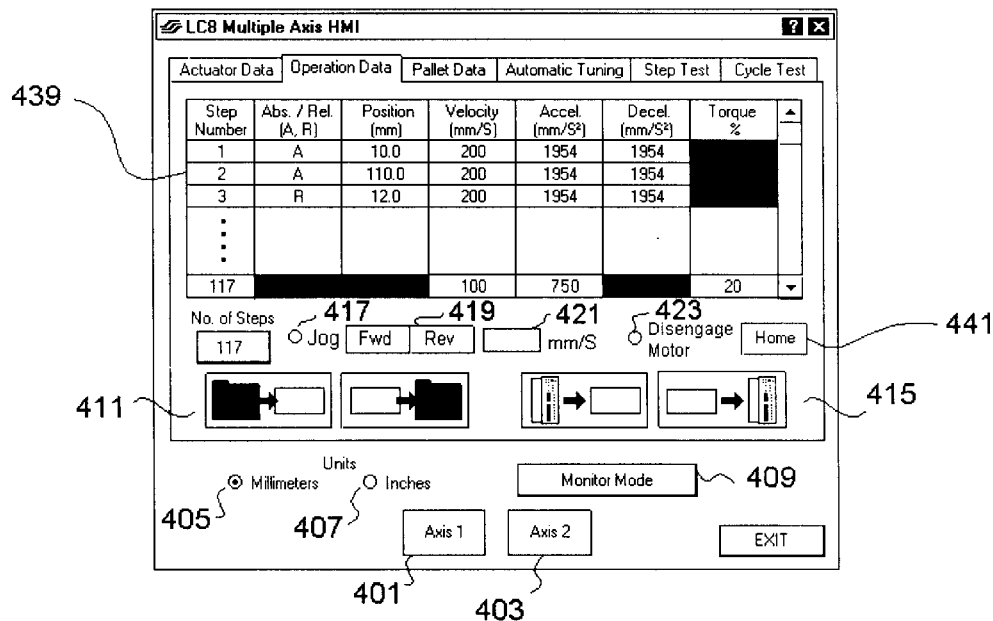
FIGS. 8A and 8B show screens for operation data and palletizing setting modes of the HMI program according to the present invention.
Figure 8B:
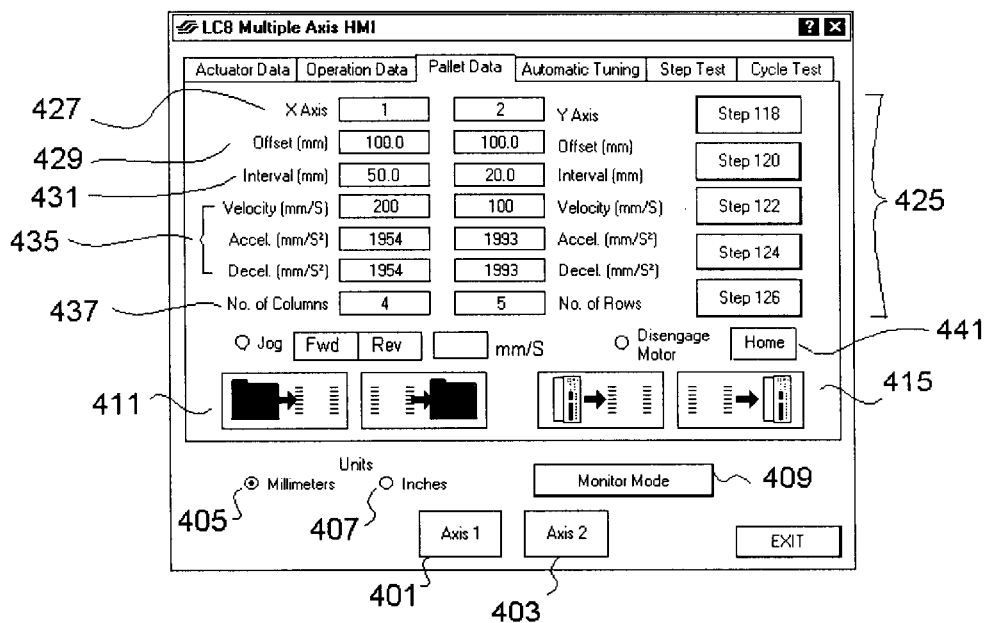

FIGS. 8A and 8B show screens for the operation data and pallet data setting modes, respectively, of the HMI program according to the present invention.

The HMI program includes, in addition, other modes for general configuration and testing of the electric actuators and controllers, which are not essential to understanding the palletizing functions to which the present invention is primarily directed. Before addressing the operation data and pallet data setting modes, such additional program features shall first briefly be described, but detailed discussion thereof shall be omitted.

An actuator data mode is provided for entering the physical characteristics of the electric actuators, which include actuator stroke, encoder resolution and ball screw pitch, for example. An automatic tuning mode is provided for enabling PID (proportion-integral-differential) gains to be calculated empirically. Calculation of PID gains for numerically controlled actuators is a well known concept discussed in numerous patent and non-patent sources and does not make up part of the present invention. Finally, two testing modes are provided. The first is a step test mode for allowing a user to observe and test the encoder outputs which indicate the acceleration-velocity-deceleration profile of the table blocks 82a, 82b in motion, and to compare the encoder output with displayed settings, for confirming whether modification to the control settings is necessary or not. The second is a cycle test mode which allows a user to test the controller as the actuator moves back and forth between two positions in repetitive cycles.

First, features which are common to both setting screens shown in FIGS. 8A and 8B shall be described.

As shown near the bottom in both screens, buttons 401 and 404 are provided for the user to select an actuator for which the settings are to apply. In this case, two actuators, designated as Axis 1 and Axis 2 are shown. Radio controls 405 and 407 are provided for setting whether the entered units are in millimeters or inches. A button 409 labeled "Monitor Mode" actually enables switching between two modes, "Monitor Mode" or "Program Mode." When the HMI is currently in program mode this label reads "Monitor Mode" and when the HMI is in monitor mode, this label reads "Program Mode." More specifically, program mode is the mode illustrated in FIGS. 8A and 8B, in which values may be entered into the input fields or text boxes, whereas monitor mode is used to call up a separate monitor mode screen (not shown) which allows an operator to observe the behavior of the actuators and outputs of the controllers as they are running. Buttons 411 enable a user to read in step data values from a text file, or to write the step data values to a text file, respectively. Buttons 415 allow the user to read in step data values which are currently stored in the Motion Profile Table (MPT) of the controller designated by the Axis buttons 401, 403, or to write out the entered step data values to the designated controller.

When the "Jog" radio control 417 is activated, the user is able to jog (move by short distances) the actuator table blocks 82a, 82b in forward or reverse directions at the jog velocity set in box 421, while the actuator position is displayed in a selected position cell, in order to set a desired position for the actuator. It is also possible to disengage the motor using radio control 423, and while the motor is disengaged, to manually slide the actuator table blocks 82a, 82b while the position of the table blocks is continuously updated and displayed in the selected position cell. Finally, a "Home" button 441 is provided which, when pressed, immediately returns the actuator table blocks 82a, 82b to the actuator home position.

FIG. 8A illustrates the operation data setting mode for setting regular moves, including absolute moves and relative moves, along with torque moves. According to this example, it is possible to enter up to 117 regular or torque move steps, per actuator. As shown, text input cells are provided in a common spreadsheet format, whereby the user inputs desired values for each of step numbers 1 through 117. Steps 1 and 2 show absolute moves (indicated by A), in which the actuator table blocks 82a, 82b are moved from their set home position to an absolute position indicated in the position field. Step 3 shows a relative move (indicated by R), in which the table blocks 82a, 82b are moved a preset distance, as indicated in the position field, from their present position. For both absolute and relative moves, it is necessary to set a maximum velocity, acceleration and deceleration.

Figure 9:
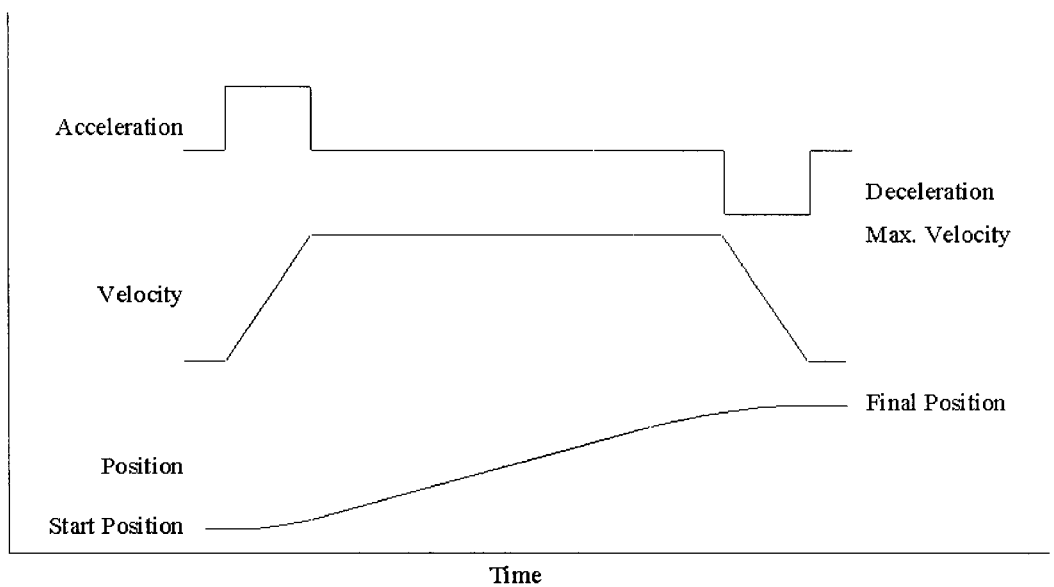
FIG. 9 is a graph for explaining motion of the transport table of an electric linear actuator according to operation data settings.

FIG. 9 is a graph for explaining motion of the table of the linear actuator according to the operation data settings. When the actuator table blocks 82a, 82b are moved between a start position and a final position, the movement follows a roughly trapezoidal velocity profile. More specifically, as shown in the middle velocity curve of FIG. 9, the velocity of the actuator first increases linearly while the actuator table is undergoing acceleration, until the actuator reaches the maximum velocity set in the velocity field. The actuator then travels at the maximum velocity for a certain period of time until it is necessary for the table block to begin decelerating, at which time the velocity decreases linearly to zero when the table block has reached the desired final position. Depending on the input values for acceleration, velocity, deceleration and position, it is possible that the actuator table blocks 82a, 82b will not reach maximum velocity before it becomes necessary for the actuator to decelerate to reach the desired final position. In this case, the table blocks 82a, 82b will accelerate to a point short of the maximum velocity and then immediately decelerate to reach the final position, producing a triangular rather than a trapezoidal profile.

Returning to FIG. 8A, step 117 illustrates a torque mode step. For torque mode, it is not necessary to enter an absolute or relative position, or deceleration, and hence these fields are inactivated and do not accept input. In torque mode, the actuator is moved at a set acceleration until it attains the maximum velocity set in the velocity field, and the actuator continues to move until it encounters a physical resistance, at which point the motor is operated at a percentage of its rated output torque, as indicated in the torque field. Torque mode is useful for controlling an electric gripper, for example, where it is desired to move the gripping members of the actuator into position to grip an object, and then hold the object while the motor continues to output a preset torque.

FIG. 8B shows the pallet data setting mode, for setting the variables necessary for performing palletizing operations. As shown, when two actuators and controllers are provided, the HMI automatically enables setting of one of the actuators as an X-axis actuator and the other as a Y-axis actuator, by inputting the controller number into respective text boxes 427 provided for each axis.

On the right-hand side of the screen, buttons 425 are provided for designating the palletizing step to which the entered data applies. Five steps are made available which are numbered as steps 118, 120, 122, 124 and 126 respectively.

As shall be explained below, intermediate step numbers 119, 121, 123, 125 and 127 are not made visible to the user, but refer to registers in the motion profile table (MPT) which hold the data (pallet variables) necessary for performing the palletizing operations defined by steps 118, 120, 122, 124 and 126.

The data shown in text boxes 427, 429 and 437 corresponds to the example situation shown in FIG. 7. Text boxes 429 are for entering offset values which define the first position $261_1$ of the pallet 218. In the example of FIG. 7, the offset values are both 100, and the first position of the pallet is taken to be the lower left-hand position $216_1$. Text boxes 431 are provided for inputting the pitch interval between pallet positions for each of the X and Y axes. Again referring to the example of FIG. 7, the pitch interval between columns along the X-axis is 50, and the pitch interval between rows along the Y-axis is 20.

Figure 11:
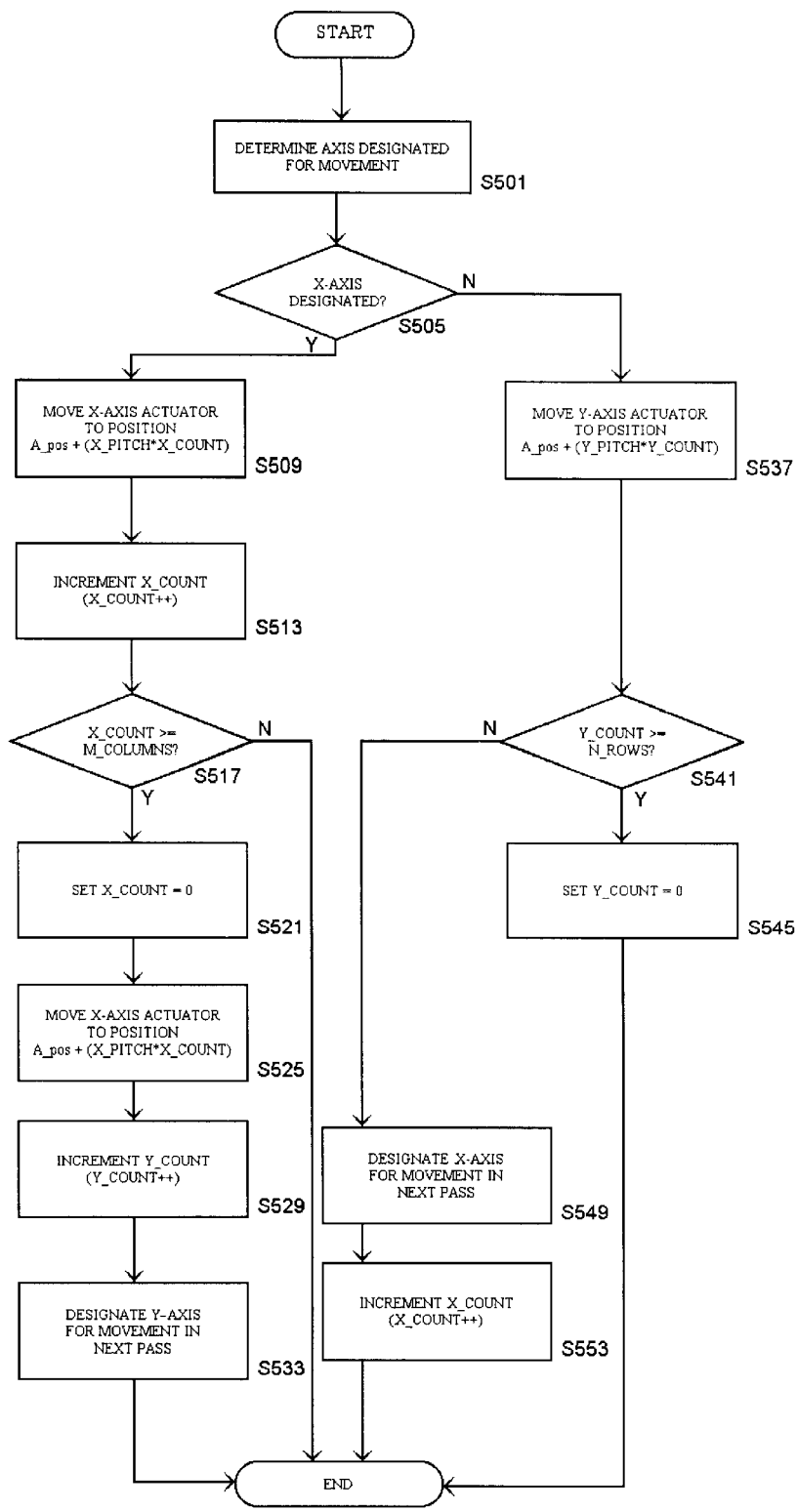
FIG. 11 is a flowchart describing operation of a palletizing routine.

Now, with reference to FIGS. 10 and 11, an exemplary palletizing operation, and in particular the algorithm for performing palletizing which is executed in a Digital Signal Processor (DSP) of the controller, shall be explained.

FIG. 10 is a representative example of data stored in respective fields of a Motion Profile Table (MPT) in the memory area of the actuator controller, and which holds the values of variables necessary for accomplishing both regular and palletized moves.

Regular Moves

As shown in FIG. 10, regular moves are stored in the MPT over a predetermined range of Step No. indexes corresponding to the number of regular steps available for the system. Regular moves come in three varieties: absolute moves, in which the actuator is operated to move the actuator table blocks 82a, 82b to a predetermined position; relative moves, in which the table blocks 82a, 82b are moved from the current position by a predetermined distance, and torque control moves, in which the actuator motor is operated to move an actuator (for example an electric gripper) at an initial acceleration and velocity until it encounters a physical resistance whereupon the motor is operated at a predetermined percentage value of its maximum rated torque.

Similar to FIG. 8A, for regular moves, values in the MPT are shown for each of an absolute move, relative move and a torque mode command. The values in the Step No. column correspond to MPT indexes of the step number for the command, which in this example ranges from 1 to 117. A position column in the MPT holds a numerical value indicating an absolute or relative position (in the case of torque mode, this field of the MPT is left empty). The velocity, acceleration, deceleration and torque fields hold numerical values which are the same as the corresponding values input in the operation mode table described in FIG. 8A.

More specifically, in the case of absolute moves, the DSP issues signals to control the designated actuator to move to a position A__pos (absolute position) indicated by a POSITION variable. In the case of a relative move, the DSP controls a designated actuator to move to a position indicated by the POSITION variable updated by the sum of its current value plus an R__pos (relative position) value. In the case of a torque mode step, a CURRENT value is supplied to the motor indicative of the percentage torque set in the MPT for that step.

Palletized Moves

In palletizing operations, as discussed in relation to FIG. 7, there is at least one absolute point and multiple palletizing points with identical pitch spacing for each of the X and Y axes. In the DSP algorithm, either the X-axis or the Y-axis is chosen by appropriate setting of a PALLET_ASSIGN register. The data for palletizing movements is located in a different range of MPT indexes from the regular moves. In this example, ten additional entries 118 through 127 in the MPT are provided for palletized moves.

As shown in FIG. 10, data entries for palletizing steps are held in the MPT after the range of Step No. indexes for regular moves. More specifically, in the illustrated example, there are 117 available indexes for regular moves, and therefore palletizing entries in the MPT begin at index 118. Each palletizing step has two associated adjacent indexes, one of which holds the variables necessary for characterizing the palletizing step, and another index associated with a step for resetting counter variables which are incremented during the adjacent preceding palletizing step.

More specifically, indexes (118, 120, 122, 124 and 126) for palletizing variables hold an absolute position corresponding to the offset value from the home position of the actuator, velocity, acceleration and deceleration values at which the actuator will move toward each of the pallet positions, a value for pitch (i.e. interval between pallet elements), and a value for the number of rows or number of columns in the pallet corresponding to the designated axis.

The adjacent indexes (119, 121, 123, 125 and 127) are used for resetting the counter variables X_COUNT or Y_COUNT (discussed below in connection with FIG. 11) for the palletizing routines executed by Step Nos. 118, 120, 122, 124 and 126 respectively. Such resetting may be required for various reasons, for example, in the case of a pallet which is not completely full, or for any other case in which it is necessary to stop palletizing at an intermediate position of the pallet array when the X and Y counters have not both been reset to zero as a result of a full cycle through the pallet.

For example, in the case of the illustrated example shown in FIGS. 7 and 8B, values will appear at the index associated with Step No. 118 in the MPT of the X-axis controller as follows: Off_Pos=100, Vel=200, Accel=1954, Decel=1954, Pitch=50, and M_Cols=4. Similarly, for the Y-axis actuator, values will appear in the index associated with Step No. 118 in the MPT of the Y-axis controller as follows: Off_Pos= 100, Vel=100, Accel=1993, Decel=1993, Pitch=20, and N_Rows=5.

The current implementation of the invention allows for up to five separate palletizing steps to be set for each axis in the system, requiring consecutively paired MPT indexes 118:119, 120:121, 122:123, 124:125 and 126:127 in each controller for holding the palletizing variables and counter reset functions therefor, respectively.

FIG. 11 is a flowchart for describing operation of a palletizing algorithm. In accordance with the algorithm, the PLC 309 will initiate actions of absolute move, relative move, torque mode, or an action to reset counters for the palletizing routine, each time a start signal is issued by the PLC 309 having a step number pointing to one of these modes, and relying on the following variables in addition to the POSITION variable:

M_COLUMNS is an integer value equal to the number of columns present in the pallet. In the example of FIG. 7, this value is 4.

N_ROWS is an integer value equal to the number or rows present in the pallet. In the case of FIG. 7, this value is 5.

X_PITCH is a value indicating the pitch spacing between objects in the pallet along each row. In the example of FIG. 7, this value is 50 units.

Y_PITCH is a value indicating the pitch spacing between objects in the pallet along each column. In the example of FIG. 7, this value is 20 units.

X_COUNT and Y_COUNT are each integer values, one of which is incremented during each pass through the palletizing routine.

The DSP of the controller is capable of executing programmable code which in the case of palletizing moves is characterized basically as follows:

```
if PALLET_ASSIGN & X_AXIS
    POSITION = A_pos + (X_PITCH[n]*X_COUNT[n]) // X-axis
else
    POSITION = A_pos + (Y_PITCH[n]*Y_COUNT[n]) //Y-axis
X_COUNT[n] ++          // increment
if X_COUNT[n] >= M_COLUMNS[n]
    X_COUNT[n] = 0
    Y_COUNT[n]++
if Y_COUNT[n] >= N_ROWS[n]
    Y_COUNT[n] = 0
```

The "n" variable in the above code designates the Step Number to which the routine is to be applied. In a typical example, as discussed above, there are five available palletizing steps numbered at 118, 120, 122, 124 and 126, respectively.

Execution of the code shall be described in connection with the flowchart of FIG. 11. It should be noted that the code shown above indicates one palletizing step, i.e. a step to pick up or release an object at one location in the pallet, wherein when the POSITION variable is initially called and each time the POSITION variable is updated in the DSP, the designated actuator is moved to a pallet location following the trapezoidal velocity profile (see FIG. 9) according to the values set in the palletizing step for velocity, acceleration and deceleration. In a typical case, after one pass through the palletizing routine has occurred, one or more regular movement steps will be executed, for example, for delivering the gripped member to a remote location (or for moving to a remote location to pick up another object to be packed into the pallet) before returning again to the palletizing step and moving to a next position in the pallet. With each consecutive execution of the palletizing step, the value for one of X_COUNTER or Y_COUNTER is incremented so that the actuator moves the end effector (for example, a gripping member) to the next location in the pallet.

Upon receipt of a START signal for a palletizing step, in Step S501, the DSP first determines by accessing the PALLET_ASSIGN register, which axis is designated for movement. Assuming the X-axis is designated in STEP S505, the routine proceeds to step S509 and issues a signal for moving the X-axis actuator 204 to a position indicated by the absolute position set in the MPT for the palletizing step, plus a value equal to the product of the pitch value for the row times an integer counter X_COUNT for the X-axis actuator. On the first initial pass through the routine, the integer value will be zero, and so the actuator table supporting the Z-axis actuator 206 will simply be moved to the absolute position at the starting point of the pallet. For example, in the arrangement shown in FIG. 7, X-axis actuator 204 will be controlled to move the Z-axis 206 actuator to position the gripper 231 at the offset position of 100 units from the home position. (It is assumed that the gripper 231 has already been moved to the appropriate position along the Y-axis actuator 208 in a preceding step.) Thus, the gripper 231 is now positioned for picking up the workpiece at the first, lower left-hand position 216$_1$ of the pallet 218.

Following movement of the X-axis actuator 204 in Step S509, the X_COUNT integer variable is incremented by 1 in Step S513. The routine then checks to see, in Step S517, whether the integer value of X_COUNT is equal to or greater than the number of columns in the pallet 218, which in the case of FIG. 7 is four. If the answer in Step S517 is NO, the routine is terminated with the value of X_COUNT remaining at its current incremented value for the next time the palletizing step is called.

If the answer in Step S517 is YES, meaning that all columns have been completed for one row, then the X_COUNT variable is restored to zero in Step S521, and the X-axis actuator is moved to the absolute position Xoff in Step S525. Then, the Y COUNT variable is incremented by one in Step S529, and in Step S533 the PALLET_ASSIGN register is changed to indicate that the Y-axis actuator 208 is designated for movement when the palletizing routine is called again.

For example, assuming the first row has been completed in the arrangement shown in FIG. 1, then the gripper returns to the Xoff position of column 1 and the Y_COUNT variable is incremented by a value of 1. Accordingly, the next time the palletizing step is effected, the routine determines that the X-axis is not designated in Step S505 and therefore advances to Step S537, and the Y-axis actuator moves the gripper 231 to the second row, first column, at position $216_5$.

Next, in Step S541 the program determines whether all rows along the Y-axis have been completed, which in the example case is 5 rows. If the answer is NO, the PALLET_ASSIGN register is changed back to designate the X-axis in Step S549, and the X_COUNT variable is incremented by 1 in Step 553 and the routine ends. Therefore, the next time the palletizing step is called, the gripping tool will be moved by the X-axis actuator, to the second column of the second row, at position 2166.

On the other hand, if the answer in Step S541 indicates that all rows have been completed, then the Y_COUNT variable is reset to zero. At this time, the X-COUNT variable will have already been set to zero in Step S521, as a result of the previous pass. Thus the palletizing routine has completed one full cycle, with both of the X_COUNT and Y_COUNT variables being returned to zero. When the palletizing step is executed again, it will begin at the original pallet position $261_1$ designated by offset positions (Xoff, Yoff).

As described above, the present invention provides a simplified method for programming a multi-axis actuator system to perform palletizing, which requires only a simple setting of minimal parameters, whereas the actual moves necessary for palletizing movements are calculated in real time by an algorithm executed in the DSP of the actuator controllers. The present invention, therefore, does not require an operator to be skilled in DSP programming. Rather, the operator need only set basic row, column and pitch values to effectively control the actuator system to perform palletizing.

It shall be understood that other modifications will be apparent and can be easily made by persons skilled in the art without departing from the scope and spirit of the present invention. Accordingly, the following claims shall not be limited by the descriptions or illustrations set forth herein, but shall be construed to cover with reasonable breadth all features which may be envisioned as equivalents by those skilled in the art.

What is claimed is:

1. A palletizing system comprising:
 a linear actuator having a movable table;
 a controller for controlling said linear actuator to execute a series of pre-stored movements;
 user interface means for entering a pitch value for at least one row of respective equidistant pallet positions, said pitch value comprising a constant interval between each of said pallet positions, wherein said user interface means comprises a pallet data entry screen for entering palletizing data including said pitch value, an acceleration value, a velocity value and a deceleration value for said linear actuator, and the number of pallet positions in said row;
 storage means in said controller for storing motion profile data, wherein said motion profile data includes said pitch value;
 processor means in said controller for executing a palletizing routine, said palletizing routine comprising the steps of:
  causing said controller to emit an output signal for moving said movable table to an initial pallet position;
  incrementing an integer value;
  updating said pallet position by adding thereto the product of said pitch value and said incremented integer value; and
  causing said controller to emit an output signal for moving said movable table to said updated pallet position.

2. The palletizing system according to claim 1, wherein after said updating step, the palletizing routine causes said controller to emit an output signal to move said table to a position different from said pallet position, before moving said movable table to said updated pallet position.

3. The palletizing system according to claim 1, wherein said user interface means comprises an operation data entry screen for entering regular move data including an absolute or relative position value, an acceleration value, a velocity value and a deceleration value for said linear actuator, for causing said movable table to move to said absolute or relative position.

4. The palletizing system according to claim 3, wherein said motion profile data is stored in a motion profile table in said controller, based on the values entered in said pallet data entry screen and said operation data entry screen.

5. The palletizing system according to claim 4, wherein said regular move data is stored in a first range of consecutive indexes of said motion profile table, and said palletizing data is stored in a second range of consecutive index pairs of said motion profile table.

6. A multi-axis palletizing system comprising:
 a plurality of linear actuators each having a movable table;
 respective controllers for controlling each of said linear actuators to execute a series of pre-stored movements;
 user interface means for entering a first pitch value for a row of respective equidistant pallet positions extending in a longitudinal direction of one of said linear actuators, and for entering a second pitch value for a column of respective equidistant pallet positions extending in a longitudinal direction of another of said linear actuators, said first and second pitch values each comprising a constant interval between each of said pallet positions in said row and said column respectively, wherein said user interface means comprises a pallet data entry screen for entering palletizing data including said first and second pitch values, first and second acceleration values, first and second velocity values, and first and second deceleration values from said one and said other linear actuators respectively, and the number of pallet positions in each of aid row and said column;

storage means in said controllers for storing motion profile data, wherein said motion profile data includes said first and second pitch values;

processor means in said controllers for executing a palletizing routine, said palletizing routine comprising the steps of:

causing the controller of at least one of said actuators to emit an output signal for moving said movable table to an initial pallet position;

incrementing a first integer value until reaching a value greater than or equal to the number of columns in said pallet;

incrementing a second integer value until reaching a value greater than or equal to the number or rows in said pallet;

updating said pallet position by adding thereto the product of said first pitch value and said incremented first integer value;

updating said pallet position by adding thereto the product of said second pitch value and said incremented second integer value, when said incremented first integer value is equal to or greater than the number of columns in said pallet; and causing said controllers to emit output signals for moving the movable tables of said one and said other linear actuators to said updated pallet positions.

7. The palletizing system according to claim 6, wherein after said updating step, the palletizing routine causes said controller to emit an output signal to move said tables to a position different from said pallet position, before moving said movable tables to said updated pallet positions.

8. The palletizing system according to claim 6, wherein said user interface means comprises an operation data entry screen for entering regular move data including absolute or relative position values, acceleration values, velocity values and deceleration values for said linear actuator, for causing said movable tables thereof to move to said absolute or relative positions.

9. The palletizing system according to claim 8, wherein said motion profile data is stored in a motion profile table in at least one of said controllers, based on the values entered in said pallet data entry screen and said operation data entry screen.

10. The palletizing system according to claim 9, wherein said regular move data is stored in a first range of consecutive indexes of said motion profile table, and said palletizing data is stored in a second range of consecutive index pairs of said motion profile table.

11. A method for palletizing with a linear actuator having a movable table and a controller for controlling the linear actuator to execute a series of pre-stored movements, comprising the steps of:

entering a pitch value for at least one row of respective equidistant pallet positions, said pitch value comprising a constant interval between each of said pallet positions;

entering palletizing data, via a user interface having a data entry screen, said palletizing data including said pitch value, an acceleration value, a velocity value and a deceleration value for said linear actuator, and the number of pallet positions in said row;

storing motion profile data in the controller of the linear actuator, wherein said motion profile data includes said pitch value;

causing said controller to emit an output signal for moving said movable table to a pallet position;

incrementing an integer value;

updating said pallet position by adding thereto the product of said pitch value and said incremented integer value; and causing said controller to emit an output signal for moving said movable table to said updated pallet position.

12. The method for palletizing according to claim 11, further comprising the step of, after said updating step, causing said controller to emit an output signal to move said table to a position different from said pallet position, before moving said movable table to said updated pallet position.

13. The method for palletizing according to claim 11, further comprising the step of entering, via said user interface, regular move data including an absolute or relative position value, an acceleration value, a velocity value and a deceleration value for said linear actuator.

14. The method for palletizing according to claim 13, further comprising the step of storing said motion profile data in a motion profile table in said controller, based on the values entered via said user interface for said palletizing data and said regular move data.

15. The method according to claim 14, further comprising the steps of storing said regular move data in first range of consecutive indexes of said motion profile table, and storing said palletizing data in a second range of consecutive index pairs of said motion profile table.

16. A method for palletizing with a plurality of linear actuators making up a multi-axis assembly, each linear actuator having a movable table and respective controllers for controlling each of said linear actuators to execute a series of pre-stored movements, comprising the steps of:

entering a first pitch value for a row of respective equidistant pallet positions extending in a longitudinal direction of one of said linear actuators, said first pitch value comprising a constant interval between each of said pallet positions in said row;

entering a second pitch value for a column of respective equidistant pallet positions extending in a longitudinal direction of another of said linear actuators, said second pitch value comprising a constant interval between each of said pallet positions in said column;

entering palletizing data, via a user interface having a data entry screen, said palletizing data including said first and second pitch values, first and second acceleration values, first and second velocity values, and first and second deceleration values for said one and said other linear actuators respectively, and the number of pallet positions in each of said row and said column;

storing motion profile data, wherein said motion profile data includes said first and second pitch values;

causing the controller of at least one of said actuators to emit an output signal for moving said movable table to an initial pallet position;

incrementing a first integer value until reaching a value greater than or equal to the number of columns in said pallet;

incrementing a second integer value until reaching a value greater than or equal to the number or rows in said pallet;

updating said pallet position by adding thereto the product of said first pitch value and said incremented first integer value;

updating said pallet position by adding thereto the product of said second pitch value and said incremented second integer value, when said incremented first integer value is equal to or greater than the number of columns in said pallet; and causing said controllers to emit output signals for moving the movable tables of said one and said other linear actuators to said updated pallet positions.

17. The method for palletizing according to claim 16, further comprising the step of, after said updating step, causing said controller to emit an output signal to move said tables to a position different from said pallet position, before moving said movable tables to said updated pallet positions.

18. The method for palletizing according to claim 16, further comprising the step of entering, via said user interface, regular move data including absolute or relative position values, acceleration values, velocity values and deceleration values for said plurality of linear actuators.

19. The method for palletizing according to claim 18, further comprising the step of storing said motion profile data in a motion profile table in at least one of said controllers, based on the values entered via said user interface for said palletizing data and said regular move data.

20. The palletizing system according to claim 19, further comprising the steps of storing said regular move data in a first range of consecutive indexes of said motion profile table, and storing said palletizing data in a second range of consecutive index pairs of said motion profile table.

* * * * *